United States Patent
Ding et al.

(10) Patent No.: US 9,661,608 B2
(45) Date of Patent: May 23, 2017

(54) BROADCAST SERVICE RESOURCE ALLOCATION METHOD, RESOURCE MANAGEMENT CENTER AND MME

(71) Applicant: ZTE Corporation, Shenzhen (CN)

(72) Inventors: Ding Ding, Shenzhen (CN); Zijiang Ma, Shenzhen (CN); Qun Li, Shenzhen (CN); Zhi Zhang, Shenzhen (CN); Gaopeng Du, Shenzhen (CN); Shouyong Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 14/399,366

(22) PCT Filed: May 24, 2013

(86) PCT No.: PCT/CN2013/076207
§ 371 (c)(1),
(2) Date: Nov. 6, 2014

(87) PCT Pub. No.: WO2013/174302
PCT Pub. Date: Nov. 28, 2013

(65) Prior Publication Data
US 2015/0098383 A1    Apr. 9, 2015

(30) Foreign Application Priority Data

May 25, 2012   (CN) .......................... 2012 1 0165600

(51) Int. Cl.
*H04W 72/00*   (2009.01)
*H04W 4/06*    (2009.01)
(Continued)

(52) U.S. Cl.
CPC ........... *H04W 72/005* (2013.01); *H04W 4/06* (2013.01); *H04L 12/189* (2013.01); *H04W 8/04* (2013.01); *H04W 60/04* (2013.01)

(58) Field of Classification Search
CPC ..... H04W 4/06; H04W 60/04; H04W 72/005; H04W 8/04; H04L 12/189
See application file for complete search history.

(56) References Cited

U.S. PATENT DOCUMENTS

| | | | |
|---|---|---|---|
| 8,175,069 B2 | 5/2012 | Wang et al. | |
| 8,712,414 B2 | 4/2014 | Somasundaram et al. | |

(Continued)

FOREIGN PATENT DOCUMENTS

| | | |
|---|---|---|
| CN | 101170816 A | 4/2008 |
| CN | 102316418 A | 1/2012 |

(Continued)

OTHER PUBLICATIONS

Huawei, "Closing some M3 open issues", Nov. 9-13, 2009, 3GPP TSG-RAN WG3 Meeting #66, R3-092901, pp. 1-4.*

(Continued)

*Primary Examiner* — Paul H Masur
(74) *Attorney, Agent, or Firm* — Eversheds Sutherland (US) LLP (57) ABSTRACT

Provided in an embodiment of the present invention are a broadcast service resource allocation method, a resource management center and an MME, the method includes: a network side receiving a tracking area update (TAU) request message reported by a user equipment (UE) after the UE moves, and determining according to the TAU request message that a first multimedia broadcast multicast service over a single frequency network (MBSFN) to which the UE belongs before the UE moves is different from a second MBSFN to which the UE belongs after the UE moves; the network side adjusting broadcasts within the first MBSFN and the second MBSFN respectively according to a service subscribed or being received by the UE.

16 Claims, 5 Drawing Sheets

(51) Int. Cl.
  *H04L 12/18* (2006.01)
  *H04W 8/04* (2009.01)
  *H04W 60/04* (2009.01)

(56) References Cited

U.S. PATENT DOCUMENTS

| | | | |
|---|---|---|---|
| 8,811,252 B2 | 8/2014 | Maeda et al. | |
| 2007/0293249 A1* | 12/2007 | Wang | H04L 12/189 455/466 |
| 2008/0049663 A1 | 2/2008 | Voyer et al. | |
| 2010/0128646 A1 | 5/2010 | Gao | |
| 2010/0189027 A1 | 7/2010 | Ishida et al. | |
| 2010/0265867 A1* | 10/2010 | Becker | H04W 72/005 370/312 |
| 2010/0322128 A1* | 12/2010 | Becker | H04W 4/08 370/312 |
| 2012/0202493 A1* | 8/2012 | Wang | H04W 60/00 455/435.1 |
| 2013/0294320 A1* | 11/2013 | Jactat | H04L 12/189 370/312 |

FOREIGN PATENT DOCUMENTS

| | | |
|---|---|---|
| EP | 1 892 978 A1 | 2/2008 |
| EP | 2 046 090 A1 | 4/2009 |
| WO | 2012/015884 A1 | 2/2012 |

OTHER PUBLICATIONS

Japanese Office Action for JP Application No. 2015-510633 mailed Jan. 5, 2016 (3 pages).

Alcatel-Lucent Shanghai Bell, "Select and Receive MBMS with Location Information," 3GPP TSG RAN WG3 Meeting #73, Athens, Greece, Aug. 22-26, 2011.

Orange SA, "Introducing MCE Initiated MBMS Session Deactivation," 3GPP TSG-RAN WG3, #71, Taipei, Taiwan, Feb. 21-25, 2011.

PCT International Search Report for PCT Application No. PCT/CN2013/076207 mailed Aug. 22, 2013 (5 pages).

\* cited by examiner

BROADCAST SERVICE RESOURCE ALLOCATION METHOD, RESOURCE MANAGEMENT CENTER AND MME

CROSS REFERENCE TO RELATED APPLICATIONS

This application claims the priority benefit of PCT/CN2013/076207 filed on May 24, 2013 and Chinese Application No. 201210165600.4 filed on May 25, 2012. The contents of these applications are hereby incorporated by reference in their entirety.

TECHNICAL FIELD

The present invention relates to the field of wireless communication, and more particularly, to a broadcast service resource allocation method, a resource management center, an MME, and a BM-SC.

BACKGROUND OF THE INVENTION

Long Term Evolution (hereinafter referred to as LTE) is a next-generation mobile broadband network standard defined in the Third Generation Partnership Project (3GPP). It uses orthogonal frequency division multiplexing (OFDM) and introduces multiple-input multiple-output (MIMO) technology, while it can support 1.25-20 MHz bandwidth, which greatly increases the peak data rate and the system capacity, and supports the peak rates of 100 Mbit/s in downlink and 50 Mbit/s in uplink within the 20 Mhz bandwidth; its flat network architecture enhances the scheduling and radio resource control efficiency, and shortens the connection delay.

The Multimedia Broadcast/Multicast Service (MBMS) has been supported in the third generation mobile communication system, and the Enhanced Multimedia Broadcast/Multicast Service (eMBMS) architected in the fourth generation mobile communication LTE system is taken as a business with strong applicability in the industry. Its implementation mode is to receive digital audio/video services in the form of broadcast/multicast by an intelligent terminal with video capability through the physical multicast channel (PMCH). For the eMBMS service implementation and networking mode, the 3GPP protocol standard gives a complete solution.

With the rapid development of Internet and the popularity of large-screen multi-function mobile terminals, there have been a lot of mobile data multimedia services and a variety of high-bandwidth multimedia services such as video conferences, television broadcasts, video-on-demand, advertisements, online education, and interactive games, which meets the mobile users' demands on multiple services on one hand, and brings new service growth point for mobile operators on the other hand. These mobile data multimedia services require multiple users to simultaneously receive the same data, which, compared to the general data services, has features of a large amount of data, long duration, and delay-sensitive.

In order to use the mobile network resources effectively, the 3GPP proposes the Multimedia Broadcast Multicast Service (MBMS). The MBMS service is a technology of sending data from one data source to a plurality of target mobile terminals, so as to achieve network (including the core network and the access network) resource sharing, and improve the network resource (particularly air interface resource) utilization. With the MBMS service defined in the 3GPP, not only the multicast and broadcast of messages with low speed and plain text can be achieved, but also the multicast and broadcast of multimedia services of high speed can be achieved, and a variety of video, audio and multimedia services are provided, which undoubtedly conforms to the trend of the future mobile data development and provides a better business prospect for the 3G development.

The enhanced Multimedia Broadcast Multicast Service (eMBMS) introduces the MBMS over a Single Frequency Network (MBSFN) transmission mode in the access network. According to the current 3GPP protocol, one MBSFN area comprises a plurality of cells, these cells are configured with the same MBSFN resources, and all the cells in one MBSFN area send the same MBMS service in these MBSFN resources. Using this transmission mode can save frequency resources and improve spectrum efficiency. At the same time, the diversity effect brought by this multi-cell co-frequency transmission can solve problems such as blind spot coverage, enhance the reception reliability, and improve the coverage rate.

The user equipment (UE, or called terminal) receiving the MBMS service can be in one of the following two states: one is RRC_CONNECTED (referred to as connected state); the other is RRC_IDLE (referred to as idle state). According to whether the UE is currently receiving the unicast service or not, whether the UE which is receiving the MBMS service is in the connected state or the idle state can be judged; when the UE is receiving the unicast service, the UE is in the connected state; the UE in the idle state does not establish a radio resources control (RRC) connection with the network side, while the UE in the connected state establishes an RRC connection with the network side.

Figure 1:
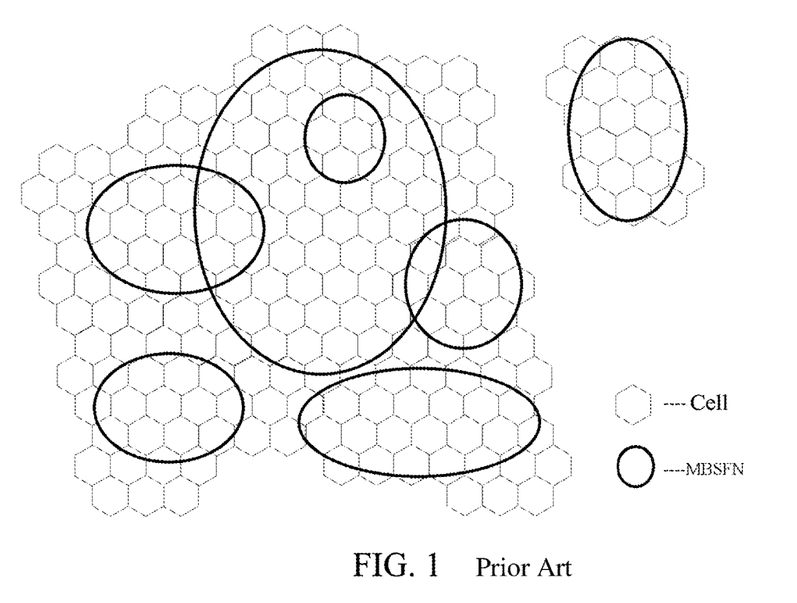
FIG. 1 is a schematic diagram of an MBSFN area divided based on the traffic service area in the related art.

According to the 3GPP protocol, the MBSFN area division generally has the following modes:

1. for a certain MEMS service, the MBSFN area is divided based on a service area of the service, as shown in FIG. 1;

By this way, the advantage is that, for a certain MBMS service, it only needs to broadcast the MBMS in the desired area, and the resource management is relatively reasonable. The downside is that, if the service areas of some services (such as: some area information, shopping advertisements, and so on) are relatively small or not continuous, thus it cannot adequately improve a receiving gain at the boundary of the cell.

Figure 2:
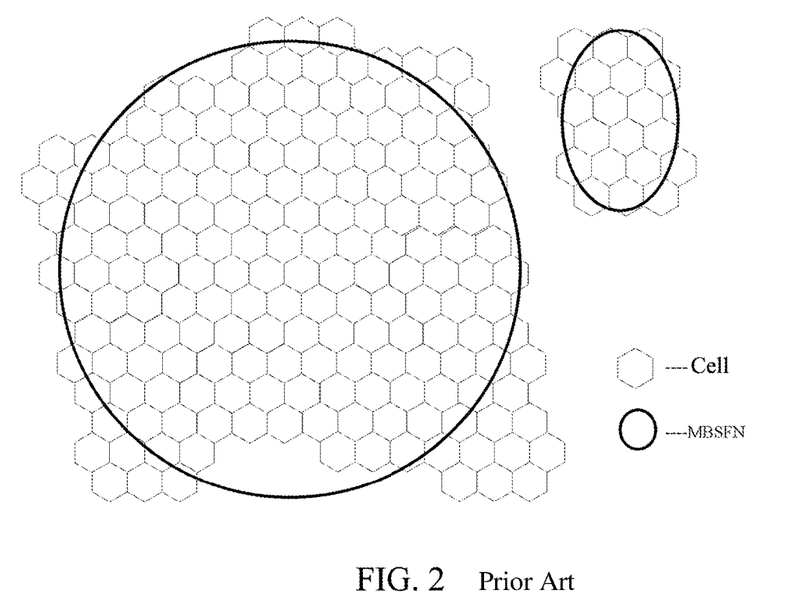
FIG. 2 is a schematic diagram of an MBSFN area divided based on the physically continuous area in the related art.

2. an MBSFN area is established on a physically continuous area, as shown in FIG. 2;

By this way, the advantage is that, by establishing a MBSFN area in a physically continuous area, it avoids the interference between the MBSFN boundaries and increases the receiving gain at the boundary of the cell. For an area that is physically discontinuous, it does not need to consider the interference between the adjacent MBSFNs and there is no receiving gain, thus different MBSFN areas can be set.

Figure 3:
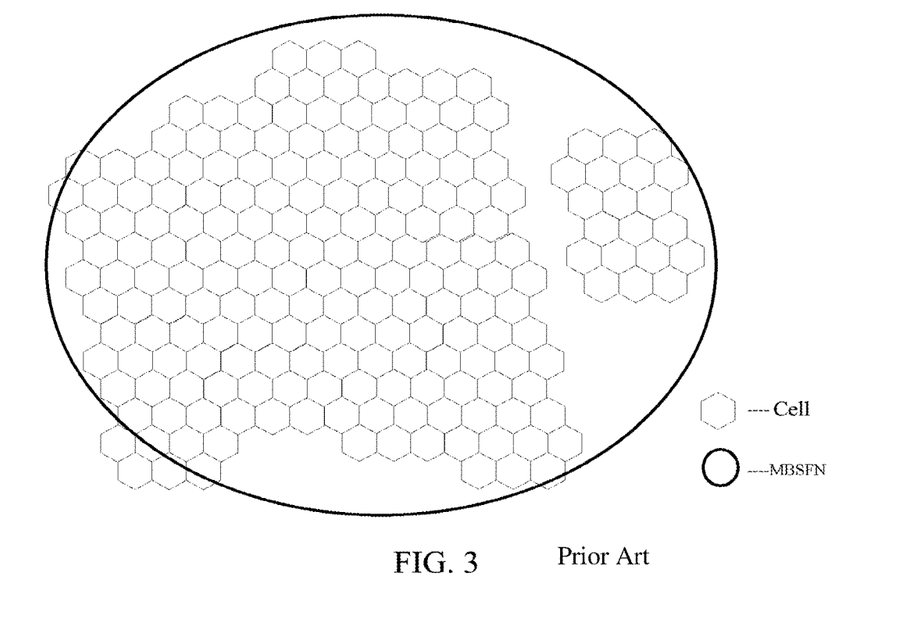
FIG. 3 is a schematic diagram of one MBSFN area for dividing an entire network in the related art.

3. one MBSFN is established in an entire network, as shown in FIG. 3.

By this way, the advantage is that the implementation is simple and the receiving gain of the UE at the boundary of the cell can be increased, and the UE has a good movability performance within the entire network.

However, according to the existing modes, no matter which one of the above three modes by which the MBSFN area is divided, for a certain MBMS service, since the location of the user equipment cannot be known, if the MBMS is broadcasted in the entire service area, if the service area is too large, and the number of the UEs is quite few or the distribution is relatively concentrated, the waste of radio resources is serious.

The 3GPP specifies that eight different MBSFN areas which are supported maximally overlay the same area, and each MBSFN area maximally supports 16 physical multicast channels (PMCH), each PMCH maximally support 29 multicast traffic control channels (MTCHs). Therefore, according to the limitations on the protocol field, the number of eMBMS sessions simultaneously supported in one cell in theory is 3480. However, due to the limitations of air interface resources, it is actually unattainable.

Mobile TV is an eMBMS based service application. Taking a mobile TV as an example to analyze, a certain city provides a 256 kbps-mobile TV service, time-division Long Term Evolution (TD-LTE) network, 20M system bandwidth, 5 ms-radio frame, and 2:2-configuration. Two eMBMS subframes can be used maximally in 10 ms. With the quadrature phase shift keying signal (QPSK) adjustment mode, it can provide about 4 Mbps data traffic in downlink, that is, about 16 channels of programs, which basically cannot meet the program capacity requirements of one city. The main reason which causes this capacity limitation is mainly that the existing ways for managing air interface resource are extensive, and in many areas, there is no terminal for receiving, and it still needs to occupy the air interface resources to broadcast. Especially when there are only few terminals receiving a certain program, it also needs to broadcast in the entire city, which largely wastes the resources.

For a certain MBMS service, once the service is sent in a certain MBSFN area, this service needs to be sent in all the cells covered by the MBSFN area. If the MBSFN area is very large, some parts (including a plurality of cells) of this area do not have one terminal that receives or is interested in receiving the service, which results in:

1) some parts of the entire MBSFN area do not have a terminal to receive, and the air interface resources still need to be occupied to broadcast, which wastes the radio resources;

2) the some parts of the area also do not have idle resources to send other MBMS services which other terminals are interested in. For example, the MBMS service 1 is transmitted in a certain MBSFN area, and there is no terminal in some part of this area interested in receiving the MBMS service 1, even though the terminals in the some part are interested in the MBMS service 2, but since the radio resources in these parts are occupied by the MBMS service 1, there are no idle resources to send the MBMS service 2.

In the LTE, a tracking area identity (TAI) is used to identify the tracking area (TA), similar to the concept of location area (LA) in the 2G/3G circuit-switched (CS) domain, or the concept of routing Area (RA) in the packet-switched (PS) domain, since there are only PS domains in the LTE, there is only the concept of TA. In fact, the LTE uses the TA list to track the location of the UE at the network side, and supports the idle state mobility (such as re-scheduling) and paging.

The tracking area update (TAU) is a TA update process. That is, when the location of a user changes and it needs to update the TA list (that is TAI), there are a number of signaling interactions with the network side.

The functions implemented by the TAU comprise:
the UE enters into a new TA, and updates the UE's current location to the network side;
updating is performed periodically, the UE periodically reports the current location;
the UE capability changes and is updated to the network side;
when the bearers in the Evolved Packet System (EPS) change, the network side is notified of which bearers are still in the activated state.

The UE may send the MME a tracking area update request message to start a TAU process.

SUMMARY OF THE INVENTION

The embodiment of the present invention provides a broadcast service resource allocation method, a resource management center, an MME and a BM-SC, to solve the problem that the capacity requirements currently cannot be met due to the unreasonable resource allocation in many cases.

The embodiment of the present invention provides a broadcast service resource allocation method, and the method comprises:

a network side receiving a tracking area update (TAU) request message reported by a user equipment (UE) after the UE moves, and determining that a first multimedia broadcast multicast service over a single frequency network (MBSFN) to which the UE belongs before the UE moves is different from a second MBSFN to which the UE belongs after the UE moves according to the TAU request message;

the network side respectively adjusting broadcasts within the first MBSFN and the second MBSFN according to a service subscribed or being received by the UE.

Preferably, the network side respectively adjusting broadcasts within the first MBSFN and the second MBSFN according to a service subscribed or being received by the UE comprises:

When the network side determines that the service subscribed by the UE is not broadcasted within the second MBSFN, broadcasting the service subscribed by the UE within the second MBSFN; as well as, when the network side determines that the service subscribed by the UE does not need to be broadcasted within the first MBSFN, stopping broadcasting the service subscribed by the UE within the first MBSFN; or When the network side determines that the UE is receiving the current service and the current service is not broadcasted within the second MBSFN, broadcasting the current service within the second MBSFN; as well as, when the network side determines that the current service does not need to be broadcasted within the first MBSFN, stopping broadcasting the current service within the first MBSFN.

Preferably, in the step of a network side determining that a first MBSFN to which the UE belongs before the UE moves is different from a second MBSFN to which the UE belongs after the UE moves according to the TAU request message, the network side obtains a tracking area (TA) list in which the UE is located according to the TAU request message, maintains and stores a correspondence relation between the UE's TA list and the corresponding MBSFN, and according to the obtained TA list in which the UE is located and the correspondence relation, determines the second MBSFN area to which the UE belongs.

Preferably, before the network side receives the TAU request message reported by the UE after the UE moves, the method further comprises:

the network side dividing a covered physical area into a plurality of sending areas, wherein each sending area comprises one or more MBSFN areas, and each MBSFN area comprises one or more TAs.

The embodiment of the present invention further provides a resource management center, and the resource management center comprises:

a determining module, configured to obtain a multimedia broadcast multicast service over a single frequency network (MBSFN) to which a user equipment (UE) belongs after the UE moves, according to a service subscribed or being received by the UE, judge whether broadcasts within the MBSFNs to which the UE belongs before and after the UE moves need to be adjusted or not, if needing to be adjusted, start a notifying module;

the notifying module, configured to send an instruction of starting or stopping broadcasting to a broadcast multicast service center (BM-SC).

Preferably, the instruction of starting broadcasting is used to instruct the BM-SC, after determining that the service subscribed or being received by the UE is not broadcasted within the MBSFN to which the UE belongs after the UE moves, to correspondingly broadcast the service subscribed or being received by the UE within the MBSFN to which the UE belongs after the UE moves; or preferably, the instruction of stopping broadcasting is used to instruct the BM-SC, after determining that the service subscribed or being received by the UE does not need to be broadcasted within the MBSFN to which the UE belongs before the UE moves, to correspondingly stop broadcasting the service subscribed or being received by the UE within the MBSFN to which the UE belongs before the UE moves.

Preferably, the determining module is configured to: receive the MBSFN which is reported by the MME and to which the UE belongs after the UE moves; or receive an updated tracking area (TA) list which is reported by the MME and to which the UE belongs after the UE moves, and according to a correspondence relation between the saved TA list and the MBSFN, as well as the TA list, obtain the MBSFN to which the UE belongs after the UE moves.

Preferably, the determining module is further configured to receive information of the service which is reported and being received by the UE; or, record the service subscribed by the UE and the MBSFN to which the UE belongs.

Preferably, the resource management center further comprises:

a maintaining module, configured to maintain and save the correspondence relation between the TA list and the MBSFN.

Preferably, the maintaining module is further configured to maintain a correspondence relation between a traffic service area and the MBSFN.

The embodiment of the present invention further provides a mobility management entity (MME), and the MME comprises:

an obtaining module, configured to, after receiving a tracking area update (TAU) request message reported by a user equipment (UE), obtain an updated tracking area (TA) list to which the UE belongs according to the TAU request message;

a reporting module, configured to report the updated TA list to which the user equipment (UE) belongs to a resource management center.

Preferably, the MME further comprises:

a maintaining module, configured to maintain and save a correspondence relation between the TA list and a multimedia broadcast multicast service over a single frequency network (MBSFN);

the reporting module is further configured to, according to the correspondence relation saved by the maintaining module and the TA list obtained by the obtaining module, obtain an MBSFN to which the UE belongs, and report the MBSFN to which the UE belongs to the resource management center.

The embodiment of the present invention further provides a broadcast multicast service center (BM-SC), and the BM-SC comprises:

a receiving module, configured to receive an instruction of starting or stopping broadcasting sent by a resource management center;

an adjusting module, configured to, in accordance with the instruction of starting broadcasting, after determining that a service currently subscribed or being received by a user equipment (UE) is not broadcasted in a multimedia broadcast multicast service over a single frequency network (MBSFN) to which the user equipment (UE) currently belongs after the UE moves, correspondingly broadcast the service currently subscribed or being received by the UE within the MBSFN to which the UE belongs after the UE moves; or according to the instruction of stopping broadcasting, after determining that the service currently subscribed or being received by the UE does not need to be broadcasted within the MBSFN to which the UE belongs at a time before the UE moves, correspondingly stop broadcasting the service currently subscribed or being received by the UE in the MBSFN to which the UE belongs at a time before the UE moves.

In the embodiment of the present invention, the standard TAU process is reused, and when the UE moves to a new TA List, the UE would report the current location of the UE, and with the correspondence relation between the TA List and the MBSFN, the network side can know the MBSFN area to which the UE belongs, so as to dynamically allocate the air interface resources in accordance with the MBSFN area to which the UE belongs, and further achieve the purpose of increasing the capacity of the entire network in some scenarios.

PREFERRED EMBODIMENTS OF THE INVENTION

Hereinafter in conjunction with the accompanying drawings, the embodiments of the present invention will be described in detail. It should be noted that, in the case of no conflict, the embodiments and features in the embodiments of the present application may be arbitrarily combined with each other.

The embodiment of the present invention provides a broadcast service resource allocation method, and in this embodiment, description is made from the network side, and the method comprises:

In step 11, after the network side receives a tracking area update (TAU) request message reported by the user equipment (UE) after the UE moves, according to the TAU request message, it determines that the first multimedia broadcast multicast service over a Single Frequency network (MBSFN) to which the UE belongs before the UE moves is different from the second MBSFN to which the UE belongs after the UE moves;

In step 12, according to the service subscribed or being received by the UE, the network side respectively adjusts the broadcasts within the first MBSFN and the second MBSFN.

The step 12 may comprise: when the network side determines that the service subscribed by the UE is not broadcasted within the second MBSFN, broadcasting the service subscribed by the UE within the second MBSFN; as well as, when the network side determines that the service subscribed by the UE does not need to be broadcasted within the first MBSFN, stopping broadcasting the service subscribed by the UE within the first MBSFN; or, when the network side determines that the UE is receiving the current service, while the current service is not broadcasted within the second MBSFN, broadcasting the current service within the second MBSFN; as well as, when the network side determines that the current service does not need to be broadcasted within the first MBSFN, stopping broadcasting the current service within the first MBSFN.

Figure 4A:
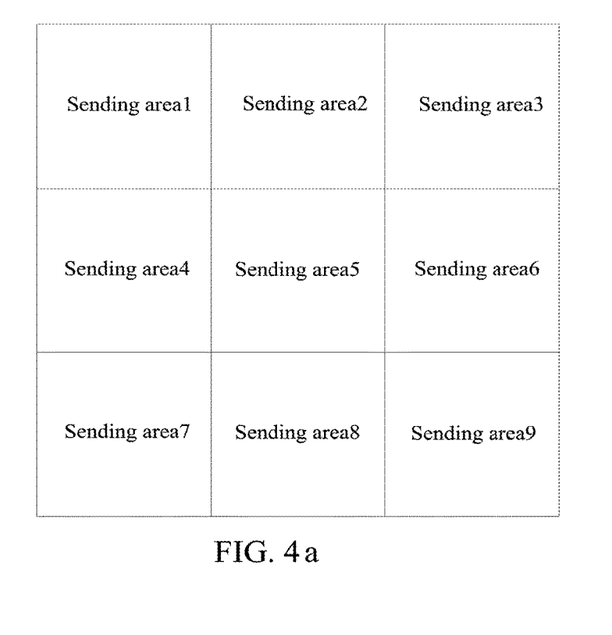
FIG. 4a is a schematic diagram of sending area division in accordance with an embodiment of the present invention.
Figure 4B:
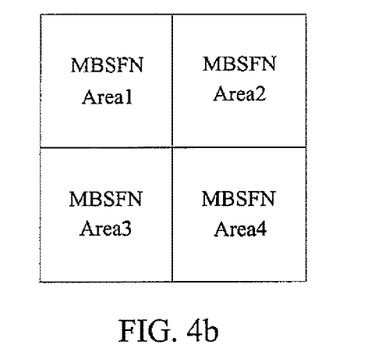
FIG. 4b is a schematic diagram of MBSFN area division in accordance with an embodiment of the present invention.

With the abovementioned broadcast service resource allocation method, the network side divides its physically covered area into a plurality of sending areas, as shown in FIG. 4a, and each sending area is uniquely identified with a sending area ID. Each sending area comprises one or more MBSFN areas, as shown in FIG. 4b.

The network side stores and maintains the correspondence relation between each sending area and the MBSFN area, namely:

network coverage area = {sending area 1, sending area 2, ... }, sending area 1 = {MBSFN area 1, MBSFN area 2, ... } sending area 2 = {MBSFN area k, MBSFN area k + 1, ... }

...

sending area N = {MBSFN area m, MBSFN area m + 1, ... }

One MBSFN area may belong to different Sending Areas. The network side stores and maintains the correspondence relation between each MBSFN area and the TA, namely:

MBSFN area 1 = {TA area 1, TA area 2, ... }

MBSFN area 2 = {TA area k, TA area k + 1, ... }

...

MBSFN area N = {TA area m, TA area m + 1, ... } and one TA area can only belong to one MBSFN Area.

The network side has a resource management center to allocate the radio air interface resources uniformly.

According to the embodiment of the present invention, the MBSFN Area comprises one or more TAs. The network side can make all the TAs within the same MBSFN Area as the TA list sent to the user equipment, that is, the boundary of one MBSFN area can meet the boundary of the TA List stored in the user equipment, so that when the user equipment moves from one TA List to another TA List in the network, it can report the location according to the standard TAU update process, the network side can know the TA List in which the user equipment is currently located, according to the correspondence relation of the MBSFN and the TA List maintained by the network side, it can obtain the MBSFN area to which the user equipment belongs. For a certain service (such as CCTV-1 programs on the mobile TV), the resource management center collects which MBSFNs in the whole network need to perform the MBMS broadcast, and triggers the BM-SC to perform a Session Update, for those MBSFN areas which do not need to broadcast the program, the air interface resources can be used to broadcast other services (such as CCTV-2 programs).

The correspondence relation between the MBSFN and the TA List is configured through the network side. The TA List area is configured at the network side, it can be one or more of TAs, and is implemented in a usual manner.

The correspondence relation between the Sending Area and the MBSFN Area dynamically changes, the network side makes statistics based on the UE's location, and when there is a UE which is interested in the service in a certain MBSFN, the MBSFN is added into the Sending Area of the service.

The abovementioned broadcast service resource allocation method reuses the standard TAU process, when the UE moves to a new TA List, the UE reports the current location of the UE, and through the correspondence relation between the TA List and the MBSFN, the network side can know the MBSFN area to which the UE belongs, so as to dynamically allocate the air interface resources according to the MBSFN area to which the UE belongs, and to achieve the purpose of increasing the capacity of the entire network in some scenarios.

Figure 5A:
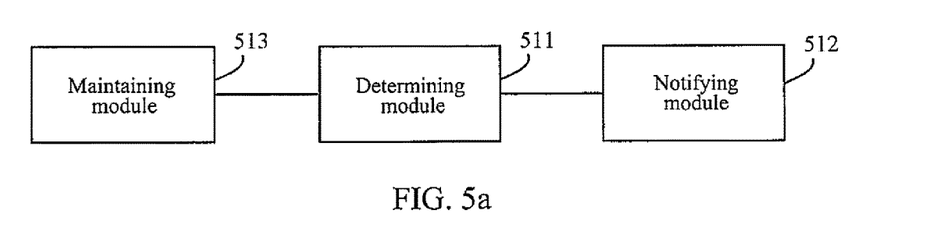
FIG. 5a is a structural diagram of a resource management center embodiment in accordance with the present invention.

FIG. 5a is a schematic diagram of the structure of a resource management center embodiment in accordance with the present invention, and the resource management center comprises a determining module 511 and a notifying module 512, wherein:

the determining module 511 is configured to obtain the multimedia broadcast multicast service over a single frequency network (MBSFN) to which the user equipment (UE) belongs after the UE moves, or according to the service subscribed or being received by the UE, judge whether the broadcasts need to be adjusted within the MBSFNs to which the UE belongs before and after the UE moves or not, and if needing to be adjusted, start the notifying module;

the notifying module 512 is configured to send an instruction of starting or stopping broadcasting to the broadcast multicast service center (BM-SC).

Wherein, the instruction of starting broadcasting is used to instruct the BM-SC, after determining that the service subscribed or being received by the UE is not broadcasted in the MBSFN to which the UE belongs after the UE moves, to correspondingly broadcast the service subscribed or being received by the UE within the MBSFN to which the UE belongs after the UE moves; or, the instruction of stopping broadcasting is used to instruct the BM-SC, after determining that the service subscribed or being received by the UE does not need to be broadcasted within the MBSFN to which the UE belongs before the UE moves, to correspondingly stop broadcasting the service subscribed or being received by the UE in the MBSFN to which the UE belongs before the UE moves.

Preferably, the determining module 512 is configured to: receive the MBSFN which is reported by the MME and to which the UE belongs after the UE moves; or receive the updated TA list which is reported by the MME and to which the UE belongs after the UE moves, and according to the correspondence relation between the stored TA list and the MBSFN as well as the TA list, obtain the MBSFN to which the UE belongs after the UE moves.

Furthermore, the determining module 512 is further configured to receive the information of the service reported and being received by the UE; or, record the service subscribed by the UE and the MBSFN to which the UE belongs.

The resource management center may further comprise: a maintaining module 513, configured to maintain and store the correspondence relation between the TA list and the MBSFN. The maintaining module is further used to maintain the correspondence relation between the traffic service area and the MBSFN.

Figure 5B:
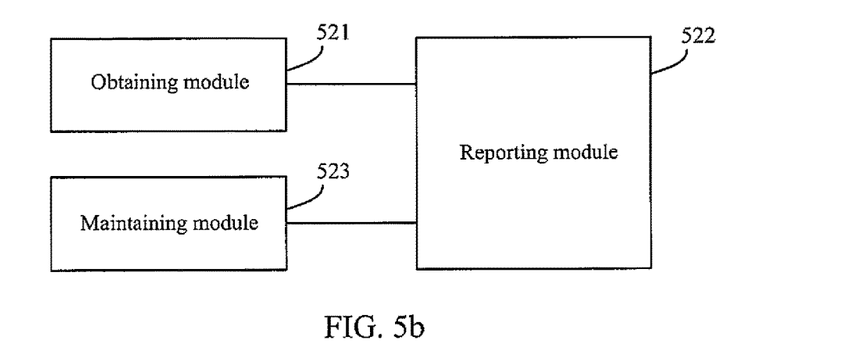
FIG. 5b is a structural diagram of an MME embodiment in accordance with the present invention.

FIG. 5b is a structural diagram of an MME embodiment in accordance with the present invention, and the MME comprises an obtaining module 521 and a reporting module 522, wherein:

the obtaining module 521 is configured to receive a tracking area update (TAU) request message reported by the user equipment (UE), and obtain the updated tracking area list (TA) to which the UE belongs according to the TAU request message;

the reporting module 522 is configured to report the updated tracking area (TA) list to which the user equipment (UE) belongs to the resource management center.

Moreover, the MME may further comprise: a maintaining module 523, configured to maintain and store the correspondence relation between the TA list and the Multimedia Broadcast multicast service over a Single Frequency Network (MBSFN); the reporting module is further configured to obtain the MBSFN to which the UE belongs according to the correspondence relation stored in the maintaining module and the TA list obtained by the obtaining module, and send the MBSFN to which the UE belongs to the resource management center.

Figure 5C:
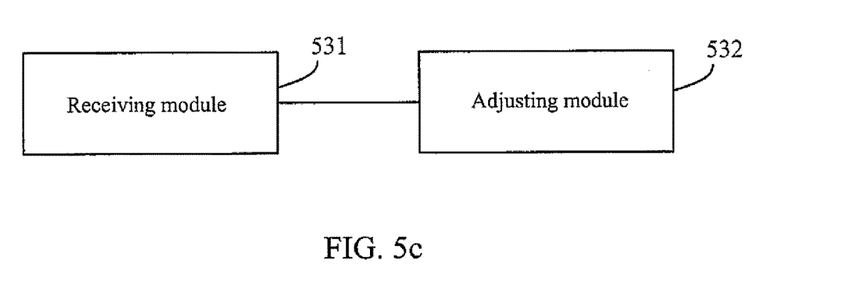
FIG. 5c is a structural diagram of a BM-SC embodiment in accordance with the present invention.

FIG. 5c is the structural diagram of a BM-SC embodiment in accordance with the present invention, and the BM-SC comprises a receiving module 531 and an adjusting module 532, wherein:

the receiving module 531 is configured to receive an instruction of starting or stopping broadcasting sent by the resource management center;

the adjusting module 532 is configured to, according to the instruction of starting broadcasting, after determining that the service currently subscribed or being received by the UE is not broadcasted within the MBSFN to which the UE currently belongs after the UE moves, correspondingly broadcast the service currently subscribed or being received by the UE within the MBSFN to which the UE belongs after the UE moves; or, in accordance with the instruction of stopping broadcasting, after determining that the service currently subscribed or being received by the UE does not need to be broadcasted within the MBSFN to which the UE belongs at the time before the UE moves, correspondingly stop broadcasting the service currently subscribed or being received by the UE within the MBSFN to which the UE belongs at the time before the UE moves.

In the following, the embodiment of the present invention will be described from the perspective of interactions between the entities:

Apparatus Embodiment

Each sending area comprises one or more MBSFN areas, and each MBSFN area comprises one or more TA Lists, when the network side sends one MBMS service in the sending area, all cells use the MBSFN mode to send the same service, that is, if one sending area comprises a plurality of MBSFN areas, the radio resources configured in each MBSFN area may be different, but the radio resources configured in all the cells in one MBSFN area must be the same.

The so-called the network side sending a service in a sending area refers to: the network side notifies the sending area and a plurality of MBSFN areas included in the sending area, and after the related base station receives the instruction from the network side, it starts or stops sending a certain MEMS service.

In the present embodiment, the network side determines in which sending area/areas that each MBMS service starts to be or stops being sent. The network side in accordance with the embodiment of the present invention may refer to: the resource management center, MME, MCE, eNB, or BM-SC.

Figure 5D:
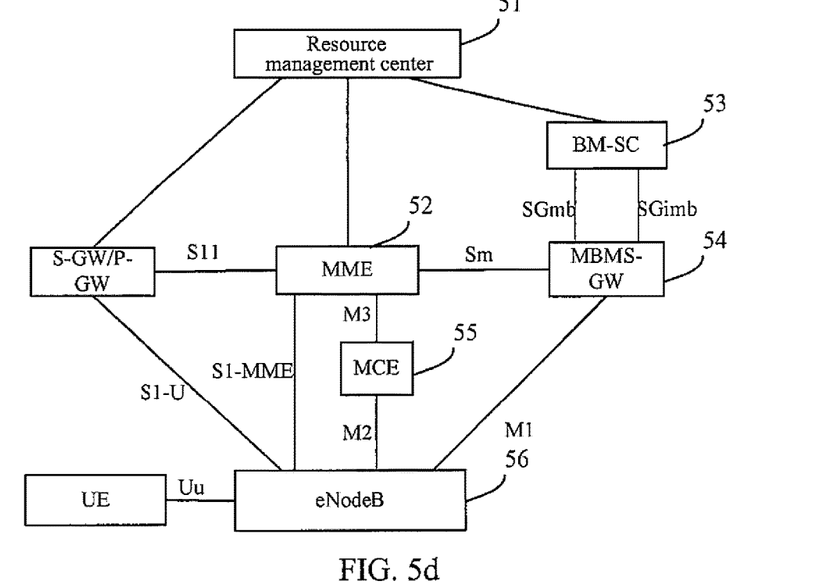
FIG. 5d is a schematic diagram of an overall architecture of a broadcast service resource allocation system in accordance with the present invention.

FIG. 5d is an overall architecture diagram of a broadcast service resource allocation system in accordance with the present invention, and the system comprises a resource management center 51, an MME 52, a BM-SC 53, an MBMS-GW 54, an MCE 55 and an evolved NodeB (eNodeB) 56, which are described respectively in the following:

the resource management center 51 is a logical network element which can be deployed individually or can be deployed with the MME 52, xGW or BM-SC 53 as one. It has one or more of the following functions:

a. it maintains a correspondence relation between a certain traffic service area and the MBSFN area;

b. it maintains a correspondence relation between the TA List and the MBSFN area;

if the MME 52 maintains the correspondence relation between the TA List and the MBSFN area, it directly reports the MBSFN to which the user equipment belongs, and the resource management center does not need to support this function;

c. it records the MBSFN area to which the user equipment belongs and the service subscribed by the UE, and collects which MBSFNs in the whole network that need to broadcast the MBMS;

d. it has an interface with the BM-SC 53, so that the BM-SC 53 can be triggered to perform a Session Update, and adjust to broadcast in which MBSFN areas in real time;

e. it has a private interface with the MME 52, and the MME 52 may report the TA List or the MBSFN to which the user equipment belongs through the interface;

f. it has an interface with the xGW, so that it can interact with the user equipment through the user plane, such as through the Session Initiation Protocol (SIP) signaling interaction.

Wherein, the structure of the resource management center is the same as the structure of the resource center management shown in FIG. 5a, and will not be described here any more.

The MME 52 supports the eMBMS function of the 3GPP. In the embodiment of the present invention, it also needs to support the interface with the resource management center, and can report the TA List or the MBSFN to which the user equipment belongs to the resource management center.

If the MME 52 reports the MBSFN to which the user equipment belongs, the MME 52 needs to maintain the correspondence relation between the TA List and the MBSFN.

Wherein, the structure of the MME 52 is the same as the structure of the MME shown in FIG. 5b, and will not be described here any more.

The BM-SC 53 supports the eMBMS function of the 3GPP. In the embodiment of the present invention, the interface with the resource management center further needs to be supported, and the resource management center can control the BM-SC to be broadcasted in which MBSFNs. Meanwhile, the information of the programs subscribed by the UE needs to be synchronized between the BM-SC and the resource management center.

Wherein, the structure of the BM-SC 53 is the same as the structure of the BM-SC shown in FIG. 5c, and will not be described here any more.

The MBMS-GW 54, the MCE 55 and the eNodeB 56 support the eMBMS function defined in the 3GPP, and in the embodiment of the present invention, no extra function needs to be supported.

The system further comprises a UE, and the UE supports the eMBMS function defined in the 3GPP, the third method embodiment of the present invention needs to support the signaling interaction with the user plane of the resource management center.

By dividing the entire network into several MBSFNs, the embodiment of the present invention can effectively improve the traffic capacity of the overall network, meanwhile it reuses the standard process as much as possible, it has very little change to the standard process and is easy to implement.

Method Embodiment

The First Embodiment

Figure 6:
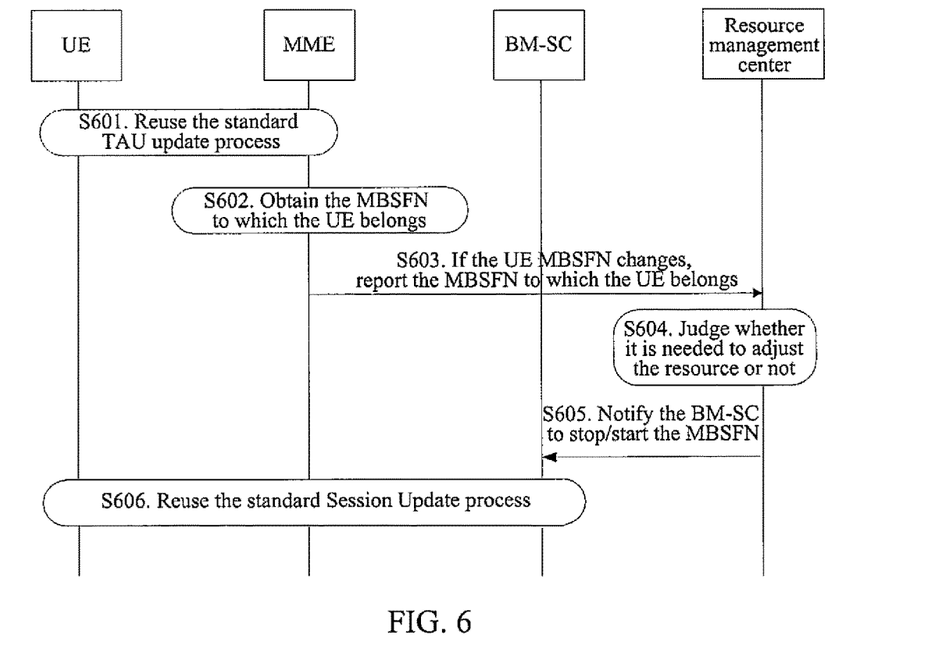
FIG. 6 is a signaling flow chart of a first embodiment of the broadcast service resource allocation method in accordance with the present invention.

As shown in FIG. 6, in the present embodiment, the UE is a user equipment that moves across the TA Lists, and the MME maintains the correspondence relation between the TA List and the MBSFN, and the UE subscribes three sets of TV programs (CCTV-1, CCTV-2, and SXTV1); the process comprises:

S601, when the UE moves from one TA List to a new TA List, the TAU updating is performed according to the standard process, and the UE does not need to change;

S602, in the TAU update process, after the MME receives the NAS message, i.e., TAU Request, it obtains the TA List to which the UE belongs, and according to the correspondence relation between the MBSFN and the TA List configured on the MME, it can obtain the new MBSFN to which the UE belongs (for convenience of description, assuming that the UE is in the MBSFN A before the UE moves and in the MBSFN B after the UE moves);

S603, if the A and B are consistent, the MME does not process, and the flow ends. If the A and B are inconsistent, the MME sends the UE identifier and the MBSFN B identifier to the resource management center;

S604, after the resource management center receives the identifiers, it saves the identifier of the MBSFN B to which the UE belongs, reads the services (CCTV-1, CCTV-2, and SXTV1) subscribed by the UE. If the three sets of programs are not broadcasted in the MBSFN B, they need to be broadcasted. Then the resource management center collects whether it is needed to broadcast the three sets of programs in the MBSFN A or not, if not, broadcasting needs to be stopped in the MBSFN A;

S605, the resource management center notifies the BM-SC of the instruction of starting or stopping eMBMS broadcasting according to a calculation condition in S604;

S606, the BM-SC adjusts to broadcast the programs in which MBSFN areas via the standard session update process according to the instruction from the resource management center.

The Second Embodiment

Figure 7:
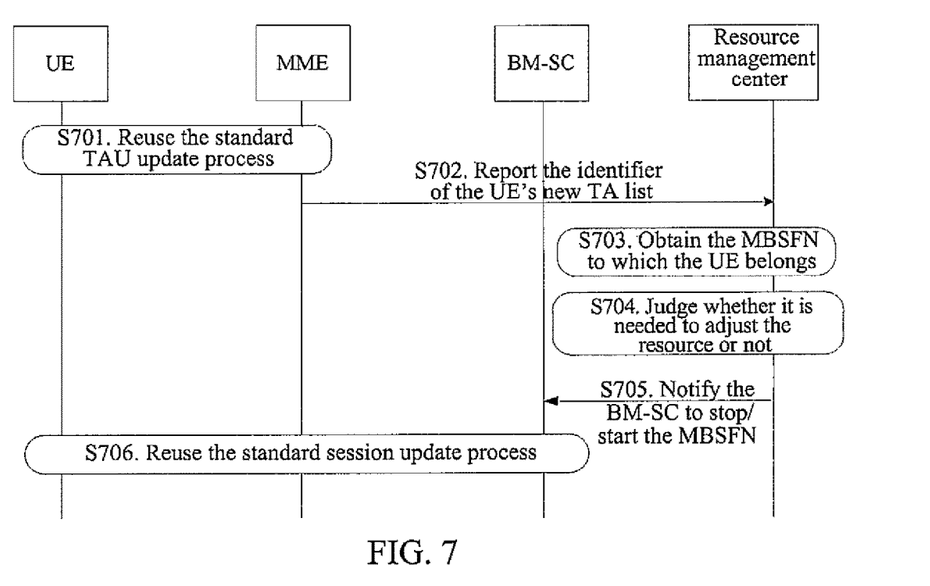
FIG. 7 is a signaling flow chart of a second embodiment of the broadcast service resource allocation method in accordance with the present invention.

As shown in FIG. 7, in this embodiment, the UE is a user equipment that moves across the TA Lists, and the resource management center maintains the correspondence relation between the TA List and the MBSFN, the UE subscribes three sets of mobile TV programs (CCTV-1, CCTV-2, and SXTV1).

The main difference between the first embodiment and the second embodiment is: the network elements maintaining the correspondence relation between the TA List and the MBSFN are different. If it is the MME maintaining the correspondence relation, it belongs to the first embodiment, and its advantage is that the messages can be filtered in the core network, so as to reduce the number of the control plane messages sent to the resource management center, and its disadvantage is that the change on the MME is a bit large.

If the resource management center maintains the correspondence relation between the TA List and the MBSFN, it belongs to the second embodiment, its advantage is that the change on the MME is small, and its disadvantage is that the load on the resource management center increases.

The process comprises:

S701, when the UE moves from one TA List to a new TA List, the TAU updating is performed according to the standard process, and the UE does not need to change;

S702, in the TAU update process, when the MME receives the NAS message, i.e., TAU Request, after it obtains the TA List to which the UE belongs, it directly reports the UE identifier and the new TA List identifier;

S703, the resource management center maintains the correspondence relation between the TA List and the MBSFN, so as to obtain the MBSFN to which the UE belongs (for convenience of description, assume that the UE is located in the MBSFN A before the UE moves, and in the MBSFN B after the UE moves). If the A and B are consistent, the resource management center does not process, and the flow ends. If the A and B are inconsistent, it needs to judge whether it is needed to adjust eMBMS broadcasting or not;

S704, the resource management center stores the identifier of the MBSFN B to which the UE belongs; reads the services (CCTV-1, CCTV-2, and SXTV1) subscribed by the UE, and if the three sets of programs are not broadcasted in the MBSFN B, they need to be broadcasted, then it collects whether it is needed to broadcast these three sets of programs in the MBSFN A or not, if not, broadcasting needs to be stopped in the MBSFN A;

S705, the resource management center notifies the BM-SC of the instruction of starting or stopping eMBMS broadcasting according to a calculation condition in S704;

S706, the BM-SC adjusts to broadcast the programs in which MBSFN areas through the standard session update process according to the instruction from the resource management center.

The Third Embodiment

Figure 8:
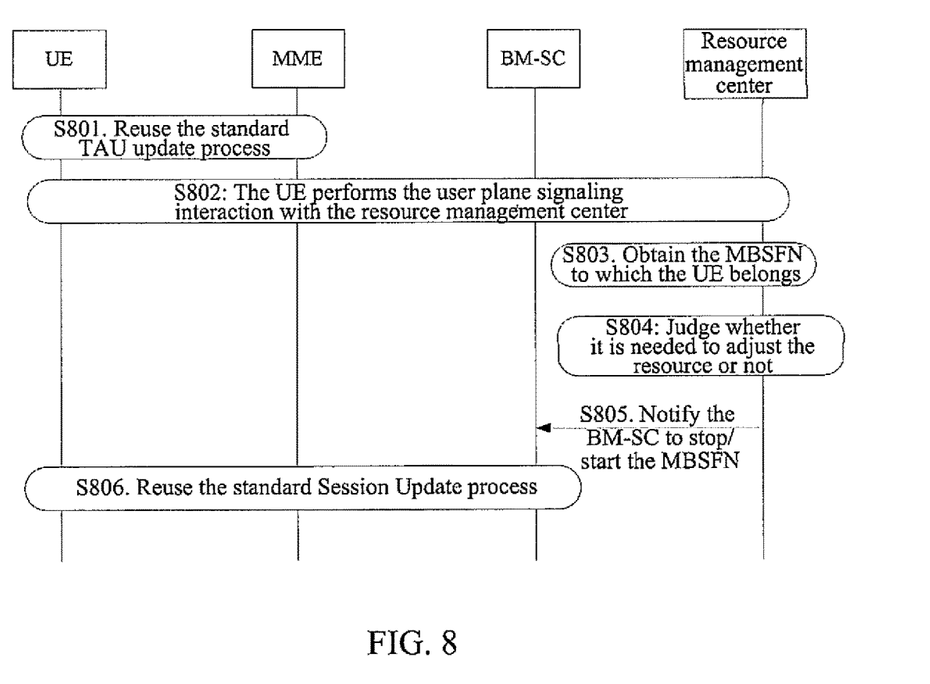
FIG. 8 is a signaling flow chart of a third embodiment of the broadcast service resource allocation method in accordance with the present invention.

As shown in FIG. 8, in this embodiment, the UE is a UE that moves across the TA Lists, the resource management center maintains the correspondence relation between the TA List and the MBSFN, the UE is receiving the CCTV-1 programs, and the IP address of the resource management center is preset in the UE.

The characteristics of the third embodiment is that the network side only needs to broadcast the program that the UE is receiving, and it does not need to broadcast the programs that are reserved but not being received by the UE.

The process comprises:

S801, when the UE moves from one TA List to a new TA List, the TAU updating is performed according to the standard process;

S802, in the TAU update process, if the UE is in the idle state, it enters into the connected state. In short, the UE establishes a default bearer in the TAU update process;

through the default bearer, the UE performs the user plane SIP signaling interaction with the resource management center according to the preset IP address of the resource management center, and informs the resource management center of the following information: the TA List to which the UE currently belongs; whether the current state of the UE is receiving the program or not, and the UE is receiving the CCTV-1 program in this embodiment;

S803, the resource management center maintains the correspondence relation between the TA List and the MBSFN, so as to obtain the MBSFN to which the UE belongs (for convenience of description, assume that the UE is located in the MBSFN A before the UE moves, and in the MBSFN B after the UE moves). If the A and B are consistent, the resource management center does not process, and the flow ends. If the A and B are inconsistent, it needs to judge whether it is needed to adjust eMBMS broadcasting or not;

S804, through reporting by the UE, the resource management center can know the program currently being received by the UE, and if the UE does not receive a program, it saves the identifier of the MBSFN B to which the UE belongs, and the flow ends. In this embodiment, the UE is receiving the CCTV-1 program, then checks whether the program is broadcasted in the MBSFN B or not, if not, the program needs to be broadcasted, and then it collects whether there is UE receiving the CCTV-1 program in the MBSFN A or not, if not, then broadcasting needs to be stopped in the MBSFN A;

S805, the resource management center notifies the BM-SC of the instruction of starting or stopping eMBMS broadcasting according to a calculation condition in S804;

S806, the BM-SC adjusts to broadcast the programs in which MBSFN areas through the standard Session Update process according to the instruction from the resource management center.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present invention is not limited to any specific form of hardware and software combinations.

The above embodiments are only used to illustrate, but not intended to limit the technical scheme of the present invention, and the present invention is only described in detail with reference to the preferred embodiments. A person skilled in the art should understand that various changes and equivalent replacements can be made for the technical scheme of the present invention without departing from the spirit and scope of the technical scheme of the present application, and all these changes and equivalent replacements should be included within the scope of the claims of the present invention.

INDUSTRIAL APPLICABILITY

With a small amount of changes, the embodiments of the present invention makes the network side know in real time about the MBSFN in which the UE is located on the basis of reusing the standard TAU update process, and then according to the services subscribed or being received by the UE, the MBSFN broadcast is adjusted in real time with the eMBMS standard process, so as to achieve the effect of dynamically allocating the air interface resources.

What is claimed is:

1. A broadcast service resource allocation method, wherein, the method comprises:
   a network side maintaining and storing a correspondence relation between a tracking area (TA) list and a multimedia broadcast multicast service over a single frequency network (MBSFN);
   the network side receiving a tracking area update (TAU) request message reported by a user equipment (UE) after the UE moves, and determining that a first MBSFN to which the UE belongs before the UE moves is different from a second MBSFN to which the UE belongs after the UE moves according to the TAU request message;
   the network side respectively adjusting broadcasts within the first MBSFN and the second MBSFN according to a service subscribed or being received by the UE.

2. The method of claim 1, wherein,
   the network side respectively adjusting broadcasts within the first MBSFN and the second MBSFN according to a service subscribed or being received by the UE comprises:
   when the network side determines that the service subscribed by the UE is not broadcasted within the second MBSFN, broadcasting the service subscribed by the UE within the second MBSFN; and, when the network side determines that the service subscribed by the UE does not need to be broadcasted within the first MBSFN, stopping broadcasting the service subscribed by the UE within the first MBSFN; or when the network side determines that the UE is receiving the current service and the current service is not broadcasted within the second MBSFN, broadcasting the current service within the second MBSFN; and, when the network side determines that the current service does not need to be broadcasted within the first MBSFN, stopping broadcasting the current service within the first MBSFN.

3. The method of claim 2, before the network side receives the TAU request message reported after the UE moves, the method further comprises:

the network side dividing a covered physical area into a plurality of sending areas, wherein each sending area comprises one or more MBSFN areas, and each MBSFN area comprises one or more TAs.

4. The method of claim 1, wherein, in the step of a network side determining that a first MBSFN to which the UE belongs before the UE moves is different from a second MBSFN to which the UE belongs after the UE moves according to the TAU request message, the network side obtains a TA list in which the UE is located according to the TAU request message, and based on the obtained TA list in which the UE is located and the correspondence relation between the TA list and the corresponding MBSFN, determines the second MBSFN area to which the UE belongs.

5. The method of claim 4, before the network side receives the TAU request message reported after the UE moves, the method further comprises:

the network side dividing a covered physical area into a plurality of sending areas, wherein each sending area comprises one or more MBSFN areas, and each MBSFN area comprises one or more TAs.

6. The method of claim 1, before the network side receives the TAU request message reported after the UE moves, the method further comprises:

the network side dividing a covered physical area into a plurality of sending areas, wherein each sending area comprises one or more MBSFN areas, and each MBSFN area comprises one or more TAs.

7. A resource management center, wherein, the resource management center comprises hardware for performing instructions stored in a non-transitory computer readable medium to execute steps in following modules:

a maintaining module, configured to maintain and save a correspondence relation between a tracking area (TA) list and a multimedia broadcast multicast service over a single frequency network (MBSFN);

a determining module, configured to obtain a MBSFN to which a user equipment (UE) belongs after the UE moves, and according to a service subscribed or being received by the UE, judge whether broadcasts within MBSFNs to which the UE belongs before and after the UE moves need to be adjusted, if needing to be adjusted, start a notifying module;

the notifying module, configured to send an instruction of starting or stopping broadcasting to a broadcast multicast service center (BM-SC).

8. The resource management center of claim 7, wherein, the instruction of starting broadcasting is used to instruct the BM-SC, after determining that the service subscribed or being received by the UE is not broadcasted within the MBSFN to which the UE belongs after the UE moves, to correspondingly broadcast the service subscribed or being received by the UE within the MBSFN to which the UE belongs after the UE moves; or the instruction of stopping broadcasting is used to instruct the BM-SC, after determining that the service subscribed or being received by the UE does not need to be broadcasted within the MBSFN to which the UE belongs before the UE moves, to correspondingly stop broadcasting the service subscribed or being received by the UE within the MBSFN to which the UE belongs before the UE moves.

9. The resource management center of claim 8, wherein, the determining module is configured to obtain the MBSFN to which the UE belongs after the UE moves by: receiving the MBSFN that is reported by a mobility management entity (MME) and to which UE belongs after the UE moves; or receiving an updated TA list that is reported by the MME and to which the UE belongs after the UE moves, and according to a correspondence relation between the saved TA list and the MBSFN as well as the TA list, obtaining the MBSFN to which the UE belongs after the UE moves.

10. The resource management center of claim 8, wherein, the determining module is further configured to receive information of the service reported and being received by the UE; or, record the service subscribed by the UE and the MBSFN to which the UE belongs.

11. The resource management center of claim 7, wherein, the determining module is configured to obtain the MBSFN to which the UE belongs after the UE moves by: receiving the MBSFN that is reported by a mobility management entity (MME) and to which UE belongs after the UE moves; or receiving an updated TA list that is reported by the MME and to which the UE belongs after the UE moves, and according to the saved correspondence relation between the TA list and the MBSFN as well as the TA list, obtaining the MBSFN to which the UE belongs after the UE moves.

12. The resource management center of claim 7, wherein, the determining module is further configured to receive information of the service reported and being received by the UE; or, record the service subscribed by the UE and the MBSFN to which the UE belongs.

13. The resource management center of claim 7, wherein, the maintaining module is further configured to maintain a correspondence relation between a traffic service area and the MBSFN.

14. A mobility management entity (MME), wherein, the MME comprises hardware for performing instructions stored in a non-transitory computer readable medium to execute steps in following modules:

a maintaining module, configure to maintain and save a correspondence relation between a tracking area (TA) list and a multimedia broadcast multicast service over a single frequency network (MBSFN);

an obtaining module, configured to, after receiving a tracking area update (TAU) request message reported by a user equipment (UE), obtain an updated TA list to which the UE belongs according to the TAU request message; and a reporting module, configured to report the updated TA list to which the user UE belongs to a resource management center.

15. The MME of claim 14,
wherein the reporting module is further configured to, according to the correspondence relation saved by the maintaining module and the TA list obtained by the obtaining module, obtain an MBSFN to which the UE belongs, and report the MBSFN to which the UE belongs to the resource management center.

16. A broadcast multicast service center (BM-SC), wherein, the BM-SC comprises hardware for performing instructions stored in a non-transitory computer readable medium to execute steps in following modules:

a receiving module, configured to receive an instruction of starting or stopping broadcasting sent by a resource management center which maintains and saves a correspondence relation between a tracking area (TA) list and a multimedia broadcast multicast service over a single frequency network (MBSFN);

an adjusting module, configured to, in accordance with the instruction of starting broadcasting, after determining that a service currently subscribed or being received by a user equipment (UE) is not broadcasted in a MBSFN to which the UE currently belongs after the UE moves, correspondingly broadcast the service currently subscribed or being received by the UE within the MBSFN to which the UE belongs after the UE moves; or according to the instruction of stopping broadcasting, after determining that the service currently subscribed or being received by the UE does not need to be broadcasted within a MBSFN to which the UE belongs at a time before the UE moves, correspondingly stop broadcasting the service currently subscribed or being received by the UE in the MBSFN to which the UE belongs at a time before the UE moves.

* * * * *